US012812459B2

(12) United States Patent
Polaganga

(10) Patent No.: US 12,812,459 B2
(45) Date of Patent: Nov. 24, 2026

(54) DOWNLINK CAPACITY AUGMENTATION FOR CAT-M USING NARROWBAND INTERNET OF THINGS

(71) Applicant: T-MOBILE INNOVATIONS LLC, Overland Park, KS (US)

(72) Inventor: Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 480 days.

(21) Appl. No.: 18/189,891

(22) Filed: Mar. 24, 2023

(65) Prior Publication Data

US 2024/0323751 A1 Sep. 26, 2024

(51) Int. Cl.
*H04W 28/02* (2009.01)
*H04W 72/0453* (2023.01)

(52) U.S. Cl.
CPC ... *H04W 28/0289* (2013.01); *H04W 28/0215* (2013.01); *H04W 28/0284* (2013.01); *H04W 72/0453* (2013.01)

(58) Field of Classification Search
CPC ......... H04W 28/0289; H04W 28/0215; H04W 28/0284; H04W 72/0453
See application file for complete search history.

(56) References Cited

U.S. PATENT DOCUMENTS 9,532,398 B2 * 12/2016 Mar ...................... H04W 52/36
9,615,283 B1 * 4/2017 Zhou ..................... H04W 24/02
10,129,832 B2 * 11/2018 Ruan ................... H04W 52/246
10,397,831 B1 * 8/2019 Kim .................... H04W 28/085
10,548,071 B2 * 1/2020 Maaref ................. H04W 48/18
10,757,604 B1 * 8/2020 Huang .................. H04W 28/06
10,841,772 B2 * 11/2020 Sundar Pal ........... H04W 80/10
10,841,791 B1 * 11/2020 Zhang ................... H04W 72/51
11,270,799 B2 * 3/2022 deSa ...................... G16H 40/63
11,368,877 B2 * 6/2022 Rushton ................ H04W 24/02
11,736,349 B2 * 8/2023 Huang .................. H04L 41/082 709/224
11,974,317 B2 * 4/2024 Yang ..................... H04W 76/23
2015/0055588 A1 * 2/2015 Yerramalli ............. H04L 5/005 370/329
2018/0027356 A1 * 1/2018 Chen ..................... H04W 24/02 370/329
2018/0041906 A1 * 2/2018 Jang ...................... H04W 16/14

(Continued)

*Primary Examiner* — Parth Patel

(74) *Attorney, Agent, or Firm* — Shook, Hardy & Bacon L.L.P.

(57) ABSTRACT

Aspects provided herein provide methods, systems, and a non-transitory computer storage media storing computer-useable instructions for downlink capacity augmentation for Internet-of-Things (IoT) devices in a network. The network first determines if at least one base station has a first IoT protocol defined in a first frequency band and a second IoT protocol defined. A determination is then made if the first frequency band is congested. Next, network elements determine if usage of the first IoT protocol exceeds a predetermined downlink threshold. It is then determined if usage of the second IoT protocol exceeds a predetermined second IoT usage threshold. A determination is made as to whether at least one IoT device supports a second frequency band. The at least one device supporting a second frequency band may then be scheduled in the second IoT protocol.

13 Claims, 6 Drawing Sheets

(56) References Cited

U.S. PATENT DOCUMENTS

| | | | | |
|---|---|---|---|---|
| 2018/0176919 | A1* | 6/2018 | Takahashi | H04W 72/0453 |
| 2018/0249382 | A1* | 8/2018 | Yang | H04W 36/0016 |
| 2018/0324148 | A1* | 11/2018 | Watts | H04L 63/0245 |
| 2018/0376417 | A1* | 12/2018 | Wang | H04L 67/12 |
| 2019/0150052 | A1* | 5/2019 | Wang | H04W 88/023 370/331 |
| 2020/0015046 | A1* | 1/2020 | Wong | H04W 24/10 |
| 2020/0252998 | A1* | 8/2020 | Spapis | H04W 16/14 |
| 2020/0280960 | A1* | 9/2020 | Liu | H04W 76/14 |
| 2020/0314730 | A1* | 10/2020 | Kollar | H04L 5/0082 |
| 2020/0337054 | A1* | 10/2020 | Kwok | H04W 48/18 |
| 2020/0374147 | A1* | 11/2020 | Ogawa | H04W 48/16 |
| 2020/0374744 | A1* | 11/2020 | Liu | H04W 28/0268 |
| 2020/0389838 | A1* | 12/2020 | Breuer | H04W 48/12 |
| 2020/0396638 | A1* | 12/2020 | Huang | H04W 72/12 |
| 2021/0004222 | A1* | 1/2021 | Huang | H04L 65/80 |
| 2021/0068005 | A1* | 3/2021 | Huang | H04W 76/11 |
| 2021/0136813 | A1* | 5/2021 | Xu | H04L 27/2607 |
| 2021/0211920 | A1* | 7/2021 | Balasubramanian | H04W 28/0221 |
| 2021/0315004 | A1* | 10/2021 | Zhang | H04W 74/002 |
| 2021/0337414 | A1* | 10/2021 | Yilmaz | H04W 40/02 |
| 2021/0337539 | A1* | 10/2021 | Lei | H04W 72/23 |
| 2022/0030462 | A1* | 1/2022 | Rotaliwala | H04L 67/306 |
| 2022/0078704 | A1* | 3/2022 | Lakshmanan | G06F 1/3209 |
| 2022/0110167 | A1* | 4/2022 | Taherzadeh Boroujeni | H04W 72/0446 |
| 2022/0132520 | A1* | 4/2022 | Karadag | H04W 72/56 |
| 2022/0150754 | A1* | 5/2022 | Perras | H04W 76/14 |
| 2022/0357939 | A1* | 11/2022 | Ward | G16Y 30/00 |
| 2022/0361108 | A1* | 11/2022 | Zhou | H04W 72/0446 |
| 2023/0125048 | A1* | 4/2023 | Iguchi | G06T 9/40 382/232 |
| 2023/0139912 | A1* | 5/2023 | Zhang | H04W 74/0866 370/329 |
| 2023/0146061 | A1* | 5/2023 | Kassir | H04W 24/10 342/59 |
| 2023/0180246 | A1* | 6/2023 | Singh | H04W 16/14 370/329 |
| 2023/0327982 | A1* | 10/2023 | Rahman | H04W 28/0958 370/228 |
| 2023/0337262 | A1* | 10/2023 | Sharma | H04W 16/14 |
| 2024/0127634 | A1* | 4/2024 | Turner | B60W 50/06 |
| 2024/0172033 | A1* | 5/2024 | Zhang | H04W 76/20 |
| 2024/0196272 | A1* | 6/2024 | Bruhn | H04W 28/0236 |
| 2024/0323751 | A1* | 9/2024 | Polaganga | H04W 28/0215 |
| 2024/0340680 | A1* | 10/2024 | Kela | H04W 24/10 |

* cited by examiner

DOWNLINK CAPACITY AUGMENTATION FOR CAT-M USING NARROWBAND INTERNET OF THINGS

BACKGROUND

Internet-of-things (IoT) devices are becoming more widely used and additional types of devices are becoming available for consumers. These IoT devices may be devices such as smart thermostats, security cameras, baby and pet monitors, and other devices. Appliances are also incorporating IoT features and connectivity. IoT technologies may use Narrowband IoT (NB-IoT) and Category-M (CAT-M), two wireless IoT protocols used by IoT devices. NB-IoT and CAT-M serve different use cases. CAT-M typically uses 1.4 MHz in bandwidth, while NB-IoT uses 200 KHz. CAT-M uses 6 physical resource blocks (PRBs) while NB-IoT uses 1 PRB. The two protocols also differ in that NB-IoT supports only data, while CAT-M is defined inside a long-term evolution (LTE) carrier. NB-IoT may be used in-band, in a guard band, or in a standalone band. The difference in bandwidth used between the IoT protocols may cause a significant capacity impact to network operators, especially in some bands of a cellular network when the two protocols coexist. These capacity impacts could potentially affect other network services offered by the network operator.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for downlink capacity augmentation for CAT-M using NB-IoT are provided. IoT devices may use a first IoT protocol, such as CAT-M, while some other IoT devices may use a second IoT protocol, such as NB-IoT. NB-IoT may be suited for devices that transmit small amounts of data periodically and do not use much transmit bandwidth. A base station or eNB may support both CAT-M and NB-IoT as well as LTE traffic, including voice and text messaging. All of these devices may cause congestion that a network operator prefers to minimize. A network operator may augment the downlink capacity of the network my transferring IoT devices to other frequency bands when the network is congested.

To augment the downlink capacity for IoT devices the network first determines that at least one base station has a first IoT protocol defined in a first frequency band. The network may then determine if the at least one base station has a second IoT protocol defined in a second frequency band. A further determination is then made if the first frequency band is congested. The congestion traffic may comprise UEs and IoT devices of various types. Next, network elements determine that usage of the first IoT protocol exceeds a predetermined downlink threshold. Next, it is then determined if usage of the second IoT protocol is below a predetermined second IoT usage threshold. Then a determination is made as to whether at least one IoT device supports a second frequency band. At least one device supporting a second frequency band may then be scheduled in the second IoT protocol.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
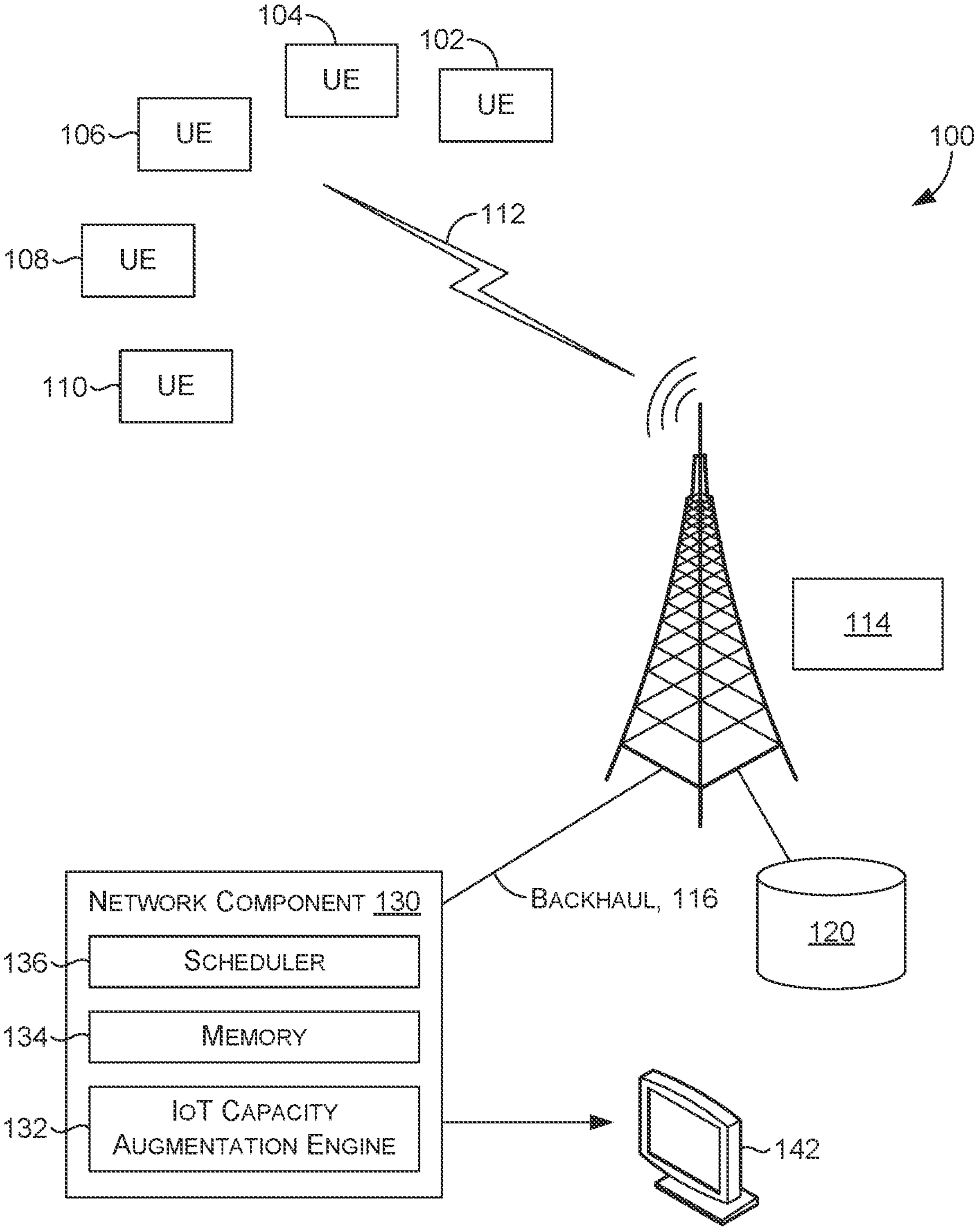
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CAT-M Category M
CD-ROM Compact Disk Read Only Memory
CDMA Code Division Multiple Access
eNodeB Evolved Node B GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
NB-IoT Narrowband Internet-of-Things
NR New Radio
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 700 described herein with respect to FIG. 7.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In accordance with a first aspect of the present disclosure a method for downlink capacity augmentation for CAT-M using NB-IoT is provided. The method begins with determining that at least one base station has a first IoT protocol defined in a first frequency band. Next, the method continues with determining if the at least one base station also has a second IoT protocol defined. The method then proceeds to determine if the first frequency band is congested. Then the first IoT protocol usage is examined to determine if that usage exceeds a predetermined first downlink threshold. The then method determines if usage of the second IoT protocol is below a predetermined second IoT usage threshold. Next, a determination is made as to whether at least one IoT device supports a second frequency band. At least one IoT device is then scheduled in the second IoT protocol.

A second aspect of the present disclosure provides a method for downlink capacity augmentation for CAT-M using NB-IoT is provided. The method begins with transmitting, by an IoT device, as instructed by a base station on a first IoT protocol defined in a first frequency band. The method continues with receiving an instruction from the base station to change at least one transmission from the first IoT protocol in the first frequency band to a second IoT protocol. The change is based on a predetermined first downlink threshold.

Another aspect of the present disclosure is directed to a non-transitory computer storage media storing computer-useable instructions that, when used by one or more processors, cause the processors to determine that a non-voice capable IoT device and a non-IoT UE are using a first frequency band. The processors then determine that the first frequency band congestion exceeds a predetermined threshold. The instructions continue with determine that the non-voice capable IoT device is capable of communicating with a base station using a second frequency band. The second frequency band is reserved for non-voice traffic and is different from the first frequency band. The processors then instruct the non-voice capable IoT device to communicate with the base station using the second frequency band.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user equipment (UE) devices 102, 104, 106, 108, and 110, base station 114 (which may be a cell site or the like), and one or more communication channels 112. An internet of things (IoT) device may also communicate through the network environment 100. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (700) that communicates via wireless communications with the base station 114 in order to interact with a public or private network.

Figure 7:
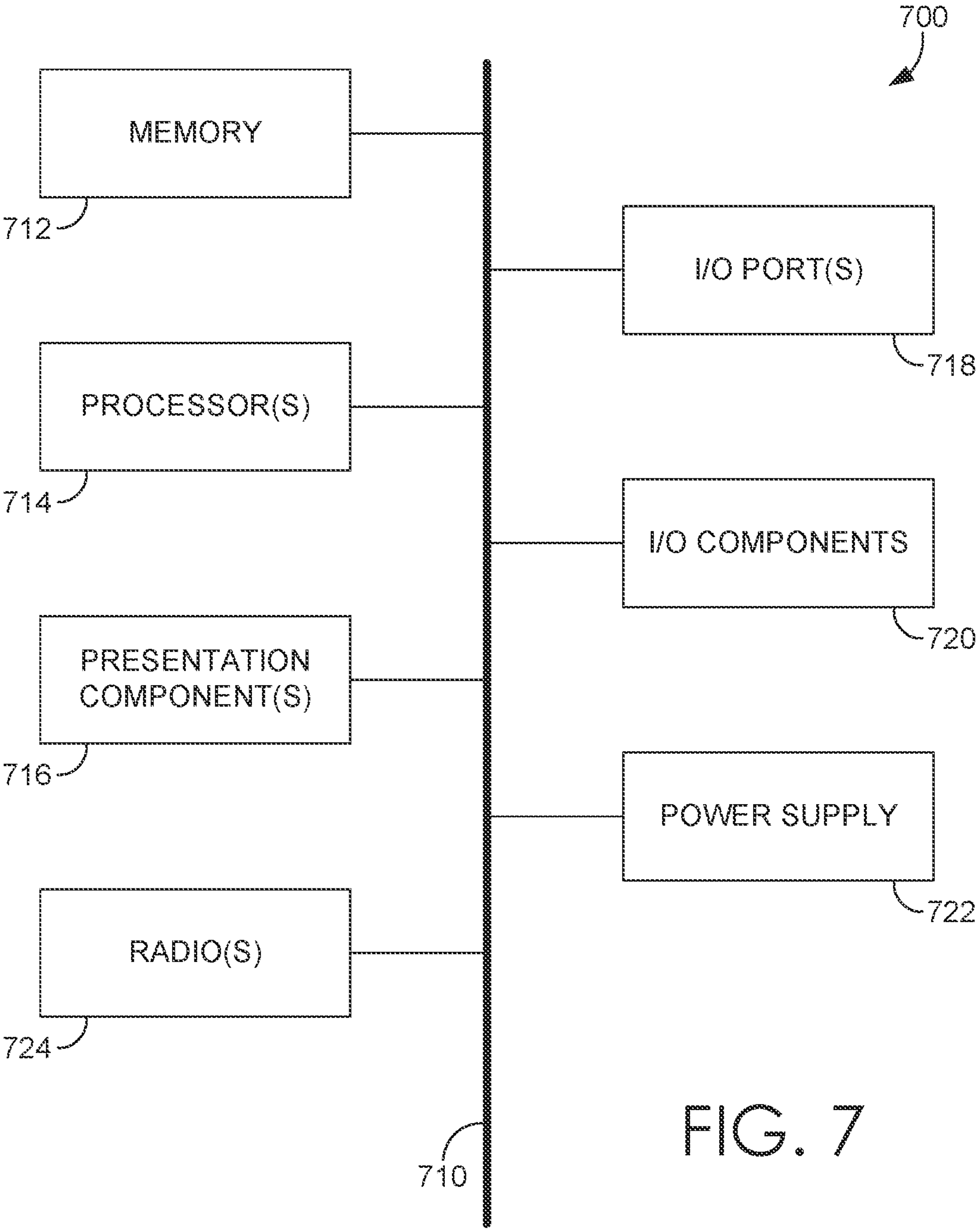
FIG. 7 depicts an exemplary computing device suitable for use in implementations of the present disclosure, in accordance with aspects herein.

In some aspects, each of the UEs 102, 104, 106, 108, and 110 may correspond to computing device 700 in FIG. 7. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102. 104, 106, 108, and 110, or corresponding users that are registered or subscribed to utilize the services provided by the telecommunications service provider. The one or more communication channels 112 can comprise, for example, a 1x circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status and usage data, the status and usage data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status and usage data from the UEs 102, 104, 106, 108, and 110, and similarly store the data in the network database 120. IoT devices (not shown in FIG. 1) may also communicate data and status to the network environment 100 through base station 114. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status and usage data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status and usage data collected by the UEs 102, 104, 106, 108, and 110 can include, for example, service state status, the respective UE's current geographic location, a current time, a strength of the wireless signal, available networks, and the like.

The network component 130 comprises an IoT capacity augmentation engine 132, a scheduler 136, and a memory 134. All determinations, calculations, and data further generated by the IoT capacity augmentation engine 132 and scheduler 136 may be stored at the memory 134 and also at the data store 140. Although the network component 130 is shown as a single component comprising the IoT capacity augmentation engine 132, memory 134, and the scheduler 136, it is also contemplated that each of the IoT capacity augmentation engine 132, memory 134, and scheduler 136 may reside at different locations, be its own separate entity, and the like, within the home network carrier system.

The network component 130 is configured to retrieve signal information, UE device information, latency information, including quality of service (QOS) information, and metrics from the base station 114 or one of the UE devices 102, 104, 106, 108, and 110. UE device information can include a device identifier and data usage information. The IoT capacity augmentation engine 132 and the scheduler 136 can monitor the activity of the UE devices 102, 104, 106, 108, and 110 as well as any NB-IoT and CAT-M devices connected to the network environment 100.

The NB-IoT protocol uses a low-power wide area network (LPWAN). It was designed for 3GPP cellular wireless communication and enables a wide range of new NB-IoT devices to operate on a 3GPP LWAN network. NB-IoT devices may operate using an unused guard band of the carrier network. The guard band is between LTE channels, however, NB-IoT devices may also operate independently. NB-IoT may be used to boost coverage beyond current cellular technologies. In order to boost coverage NB-IoT uses transmission repetitions and different bandwidth allocations for uplink transmission. NB-IoT may be used for a broad range of devices, such as smart thermostats, home security cameras, and similar devices. In addition, NB-IoT offers advantages including reduced power consumption while increasing bandwidth efficiency and system capacity. In addition, NB-IoT uses simple waveforms for connectivity with less power and is better able to penetrate buildings.

CAT-M is an LPWAN technology that supports IoT devices. It uses a network designed to support and optimize IoT devices. CAT-M also allows a direct connection to a 4G network. CAT-M operates on a lower spectrum than other IoT protocols and uses a higher transmit power. CAT-M is suitable for data transfer at low to medium transmission rates over a long range.

Figure 2:
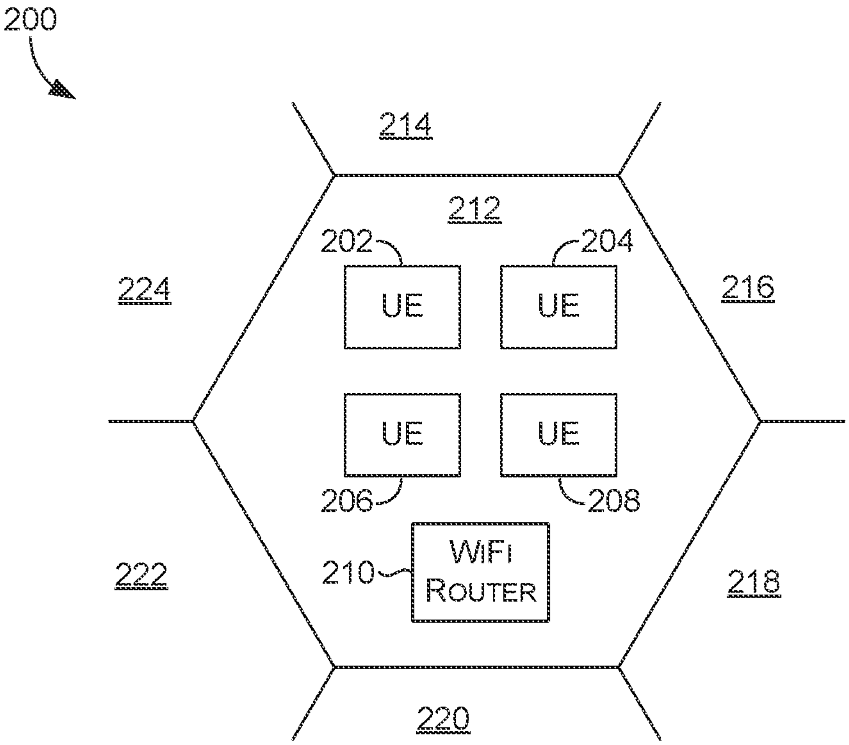
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and WiFi router 210, may be located within geographic area 200 collecting UE data that is useable by network component 130, in accordance with aspects herein. UEs 202, 204, 206, and 208 can move within the cell currently occupying, such as cell 212 and can move to other cells such as adjoining cells 214, 216, 218, 220, 222 and 224.

NB-IoT and CAT-M serve different use cases for IoT devices. The bandwidth for CAT-M may have 1.4 MHz bandwidth while NB-IoT may have a bandwidth of 200 KHz. These bandwidths translate to 6 PRBs for CAT-M and 1 PRB for NB-IoT. CAT-M operates inside an LTE carrier while NB-IoT may operate in-band, in a guard band, or standalone. In 3GPP release band 85 contains and additional 1 MHz of bandwidth when compared to band 12 for uplink and downlink.

Figure 3:
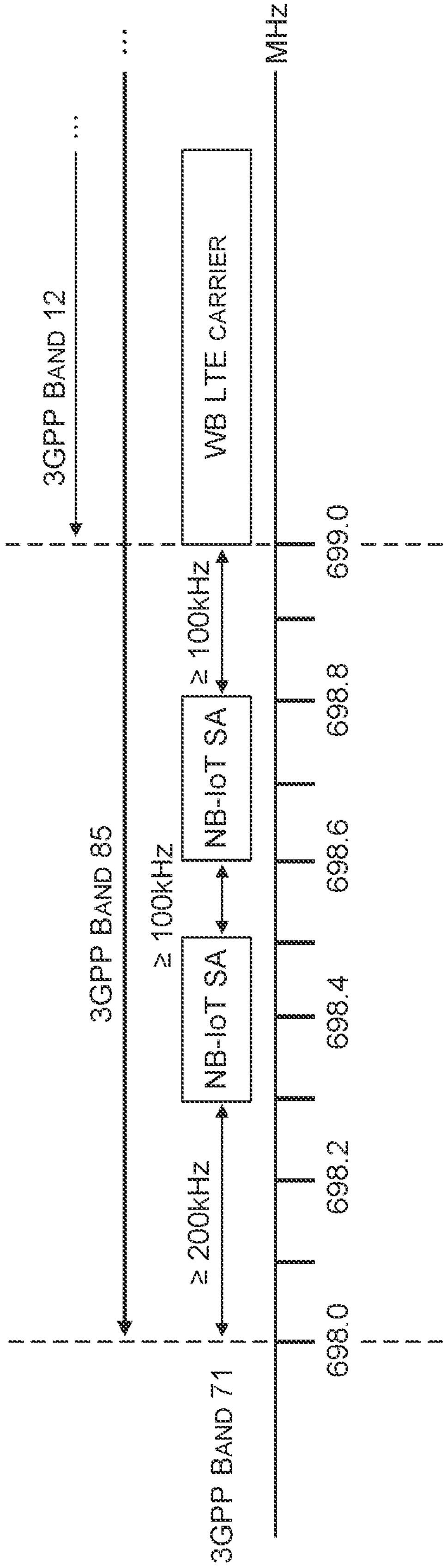
FIG. 3 depicts a diagram of an exemplary network bandwidth allocation that may be used to increase CAT-M downlink capacity, in which implementations of the present disclosure may be employed, in accordance with aspects herein.

FIG. 3 depicts a diagram of an exemplary network bandwidth allocation that may be used to increase CAT-M downlink capacity, in which implementations of the present disclosure may be employed. FIG. 3 illustrates a band allocation for a network operator that has an additional 1 MHz band that is found to the left of 3GPP Band 12. This additional 1 MHz may be used to deploy standalone NB-IoT with a maximum of 2 PRBs. Band 12 LTE is a nationwide 5 MHz band along with a CAT-M defined within 5 MHz. This 5 MHz band also has CAT-M defined so that six of the available 25 PRBs may be used by CAT-M users. The loss of six PRBs to CAT-M has a significant effect on the capacity, making the coexistence of LTE and CAT-M difficult to sustain.

Augmenting the CAT-M downlink capacity with two additional PRBs from standalone NB-IoT when not in use is illustrated in FIG. 3. These additional PRBs are illustrated to the left of 3GPP Band 12 and may be separated by 100 MHz and are found in 3GPP Band 85. The use of these additional PRBs improve the experience of UEs, such as UEs 102, 104, 106, 108, and 110 in FIG. 1.

Figure 4:
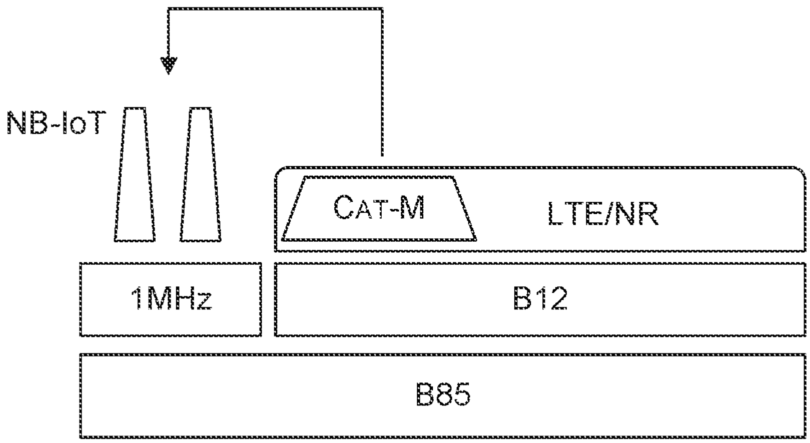
FIG. 4 is a diagram of an internet of things (IoT) device spectrum allocation in an exemplary network supporting CAT-M, NB-IoT, and LTE, in which implementations of the present disclosure may be employed, in accordance with aspects herein.

FIG. 4 is a diagram of an internet of things (IoT) device spectrum allocation in an exemplary network supporting CAT-M, NB-IoT, and LTE. In FIG. 4 band B85 underlies the network operations. Band B12 overlays band B85 with the 1 MHz of additional spectrum to the left. The 1 MHz of additional spectrum may be used for NB-IoT if needed. The additional spectrum may be needed for NB-IoT if the network is congested. When congestion occurs the IoT devices may be moved to the additional NB-IoT spectrum. These devices may be using the CAT-M spectrum that is a subset of the LTE/NR spectrum. Transferring the IoT devices to the additional 1 MHz frees up 6 PRBs for UEs to use.

Figure 5:
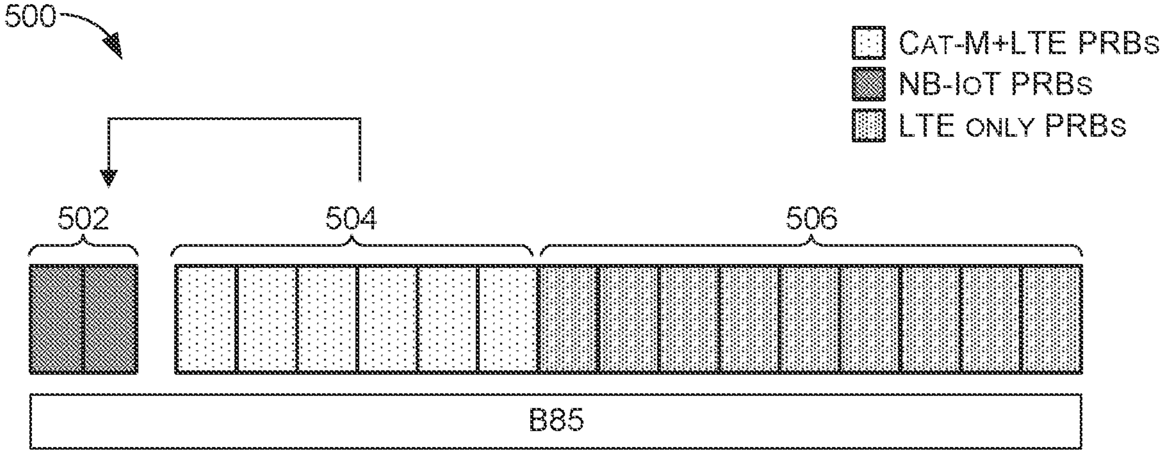
FIG. 5 is a diagram of PRB allocation in a network supporting CAT-M, NB-IoT, and LTE, in which implementations of the present disclosure may be employed, in accordance with aspects herein.

FIG. 5 is a diagram of PRB allocation in a network supporting CAT-M, NB-IoT, and LTE, in which implementations of the present disclosure may be employed. The PRB allocation 500 includes two transfer PRBs 502 that form the additional 1 MHz that NB-IoT devices may be transferred to in order to relieve congestion on the LTE/NR bands. The NB-IoT devices may be transferred from the CAT-M and LTE PRB allocation 504 that is used for CAT-M and LTE. The remaining PRBs are LTE only PRBs 506. The arrow indicates the transfer of IoT devices from the CAT-M and LTE PRB allocation 504. No transfers occur from the LTE only PRBs 506.

Augmenting the CAT-M downlink capacity begins at the base station. If an eNB has CAT-M defined in the LTE band then the standalone NB-IoT is defined next to the CAT-M defined LTE band on the same eNB. In operation, the method begins with determining if the LTE band is congested in downlink. Congestion on the LTE band may be based on a downlink congestion threshold. The downlink congestion threshold may be determined using signal quality metrics, a number of devices using the downlink, both UE and IoT devices, both CAT-M and NB-IoT. If the LTE band is congested in downlink if the downlink usage is above the downlink congestion threshold.

Next, the CAT-M usage is also examined to determine if it is also above the downlink congestion threshold. The standalone NB-IoT usage is also compared with the downlink congestion threshold and the downlink capacity augmentation method may continue if the standalone NB-IoT usage is less than the downlink congestion threshold. The downlink congestion threshold may be based on a number of devices or the usage of the band. The NB-IoT usage should be less than the downlink congestion threshold in order for there to be sufficient bandwidth to transfer IoT devices to the additional 1 MHz. Next it is determined if the IoT device supports the full B85 band, if so, then the device may be scheduled on the additional 1 MHz bandwidth. Non-guaranteed bit rate CAT-M traffic is then scheduled in the standalone NB-IoT PRBs. No voice traffic is scheduled in the additional 1 MHz band.

Figure 6:
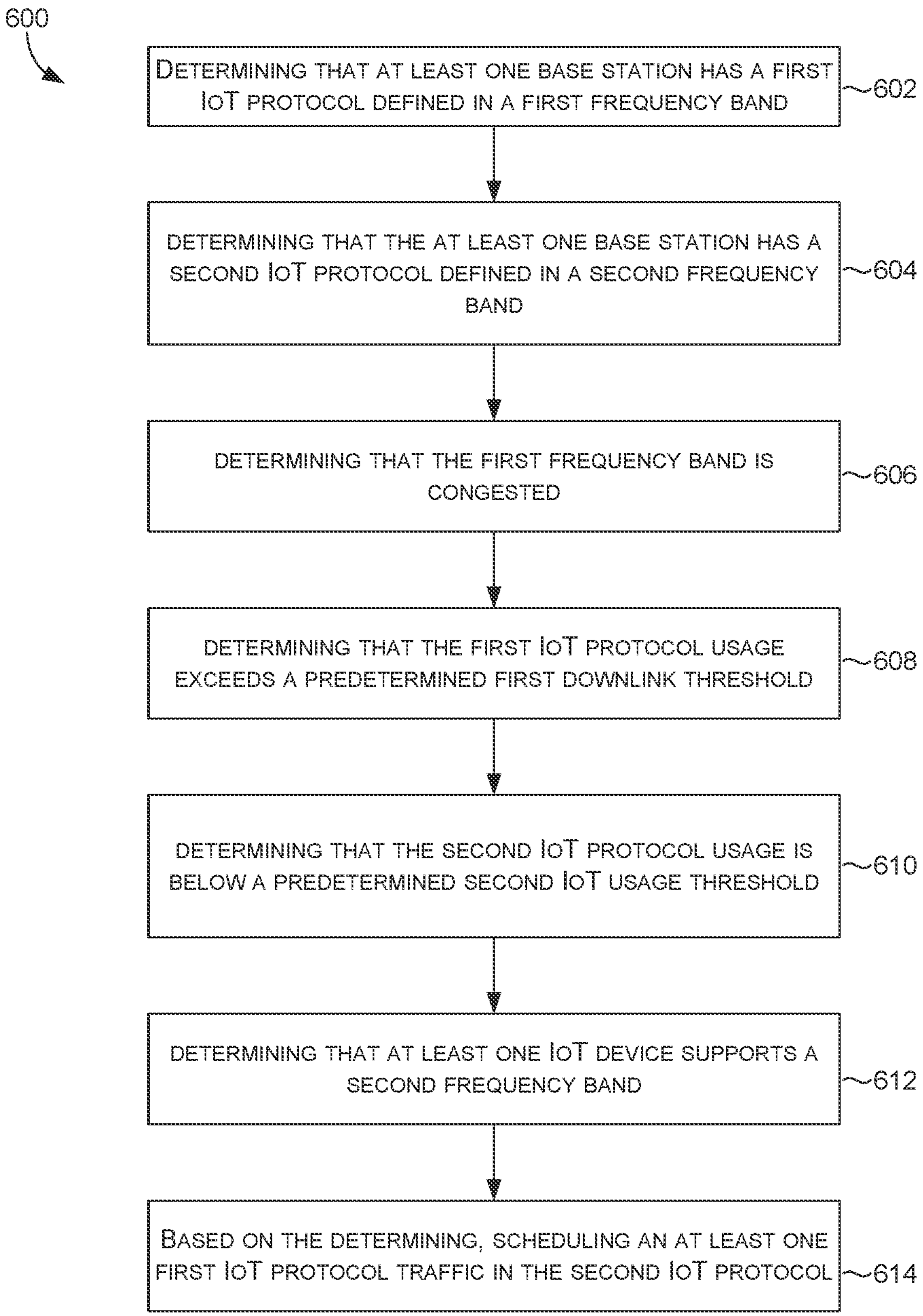
FIG. 6 is a flow diagram of an exemplary method for downlink capacity augmentation for CAT-M using NB-IoT, in which aspects of the present disclosure may be employed, in accordance with aspects herein.

FIG. 6 is a flow diagram of an exemplary method for downlink capacity augmentation for CAT-M using NB-IoT, in which aspects of the present disclosure may be employed. The method 600, begins in step 602 with determining that at least one base station has a first IoT protocol defined in a first frequency band. The method continues in step 604 with determining that the at least one base station has a second IoT protocol defined. The method proceeds to step 606, where congestion in the first frequency band is determined. The method continues in step 608 with determining if a first IoT protocol usage exceeds a predetermined threshold. The predetermined threshold may be based on a number of devices using the first protocol, or may be based on how much bandwidth the devices are using.

Then, in step 610, a determination is made as to whether a second IoT protocol usage is below a predetermined second IoT usage threshold. In step 612, it is determined if a second IoT protocol usage exceeds a predetermined second IoT usage threshold. Next, in step 614 the method continues with determining if at least one IoT device supports a second frequency band. The method concludes in step 616 when based on the determining, scheduling at least one IoT device in the second IoT protocol occurs.

The second IoT protocol may be adjacent to the first IoT protocol in a band plan. The second IoT protocol may use a second IoT protocol frequency band located in a second frequency band that is adjacent to the first IoT protocol frequency band. The first frequency band may be used for guaranteed bit rate (GBR) traffic and non-GBR traffic. It is the non-GBR IoT traffic that may be suitable for moving to the second IoT protocol. When an IoT device is instructed to change its transmission from the first IoT frequency band to the second IoT frequency band the traffic consists of PRBs. The PRBs may be scheduled in at least one of the two separate 1 MHz bands depicted in FIG. 3.

FIG. 7 depicts an exemplary computing device suitable for use in implementations of the present disclosure, in accordance with aspects herein. With continued reference to FIG. 7, computing device 700 includes bus 710 that directly or indirectly couples the following devices: memory 712, one or more processors 714, one or more presentation components 716, input/output (I/O) ports 718, I/O components 720, radio 724, and power supply 722. Bus 710 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 720. Also, processors, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. Memory 712 may be removable, nonremovable, or a combination thereof. Exemplary memory includes solid-state memory, hard drives, optical-disc drives, etc. Computing device 700 includes one or more processors 714 that read data from various entities such as bus 710, memory 712 or I/O components 720. One or more presentation components 716 present data indications to a person or other device. Exemplary one or more presentation components 716 include a display device, speaker, printing component, vibrating component, etc. I/O ports 718 allow computing device 700 to be logically coupled to other devices including I/O components 720, some of which may be built into computing device 700. Illustrative I/O components 720 include a microphone, joystick, game pad, satellite dish, scanner, printer, wireless device, etc.

The radio 724 represents one or more radios that facilitate communication with a wireless telecommunications network. While a single radio 724 is shown in FIG. 7, it is contemplated that there may be more than one radio 724 coupled to the bus 710. In aspects, the radio 724 communicates with the wireless telecommunications network. It is expressly conceived that a computing device with more than one radio 724 could facilitate communication with the wireless telecommunications network. Illustrative wireless telecommunications technologies include CDMA, GPRS, TDMA, GSM, and the like. The radio 724 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 724 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for downlink capacity augmentation for Internet-of-Things (IoT) devices in a network, the method comprising:

determining that at least one base station has a first IoT protocol defined in a first frequency band;

determining that the at least one base station has a second IoT protocol defined in a second frequency band;

determining that the first frequency band is congested based on IoT protocol usage, wherein determining that the first frequency band is congested comprises determining that usage of the first IoT protocol exceeds a predetermined first downlink threshold and determining that usage of the second IoT protocol is below a predetermined second IoT usage threshold;

determining that at least one IoT device supports the second frequency band; and based on determining that the usage of the first IoT protocol exceeds the predetermined first downlink threshold and that the usage of the second IoT protocol is below the predetermined second IoT usage threshold, reassigning the at least one IoT device from the first IoT protocol to the second IoT protocol to augment downlink capacity, and scheduling downlink traffic for the at least one IoT device using the second IoT protocol in the second frequency band.

2. The method of claim 1, wherein the second IoT protocol is adjacent to the first IoT protocol.

3. The method of claim 2, wherein a second IoT protocol frequency band in the second frequency band is adjacent to a first IoT protocol frequency band in the first frequency band.

4. The method of claim 1, wherein determining if the first frequency band is congested is based on a number of devices using the first frequency band.

5. The method of claim 4, further comprising determining if the number of devices using the first frequency band exceeds an operator defined congestion threshold.

6. The method of claim 4, wherein the number of devices using the first frequency band includes IoT devices and user equipments (UEs).

7. The method of claim 1, wherein determining if the first frequency band is congested is based on a number of devices using the first frequency band at the at least one base station.

8. The method of claim 7, wherein the usage of the first frequency band is based on guaranteed bit rate (GBR) traffic and non-GBR traffic.

9. The method of claim 1, wherein scheduling the at least one IoT device in the second IoT protocol includes scheduling at least one physical resource block (PRB) in the second frequency band.

10. The method of claim 9, wherein the at least one PRB is scheduled in a first segment of the second frequency band.

11. The method of claim 10, wherein the at least one PRB is scheduled in a second segment of the second frequency band.

12. The method of claim 11, wherein the second segment of the second frequency band is 1 MHz.

13. The method of claim 10, wherein the first segment of the second frequency band is 1 MHz.

* * * * *